United States Patent
Antonakakis

(10) Patent No.: US 9,494,279 B2
(45) Date of Patent: Nov. 15, 2016

(54) VEHICLE OIL PAN WITH ACTIVE NOISE REDUCTION CONTROL

(71) Applicant: Toyota Motor Engineering & Manufacturing North America, Inc., Erlanger, KY (US)

(72) Inventor: Michael E. Antonakakis, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/520,315

(22) Filed: Oct. 21, 2014

(65) Prior Publication Data

US 2016/0109062 A1    Apr. 21, 2016

(51) Int. Cl.
| | | |
|---|---|---|
| *G06F 7/00* | (2006.01) | |
| *F16N 29/00* | (2006.01) | |
| *F16N 19/00* | (2006.01) | |
| *F16N 31/00* | (2006.01) | |
| *F16N 39/02* | (2006.01) | |
| *F16N 39/04* | (2006.01) | |
| *H05B 3/00* | (2006.01) | |

(52) U.S. Cl.
CPC ............. *F16N 29/00* (2013.01); *F16N 19/00* (2013.01); *F16N 31/002* (2013.01); *F16N 39/02* (2013.01); *F16N 39/04* (2013.01); *H05B 3/0014* (2013.01)

(58) Field of Classification Search
CPC ...... F16N 29/00; F16N 19/00; F16N 31/002; F16N 39/02; F16N 39/04; H05B 3/0014
USPC ............................... 701/36, 58; 477/176
See application file for complete search history.

(56) References Cited

U.S. PATENT DOCUMENTS

| | | | | |
|---|---|---|---|---|
| 4,522,166 A | * | 6/1985 | Toivio .................... | B01D 35/18 123/196 A |
| 4,877,222 A | * | 10/1989 | Davis .................... | B60G 11/265 188/274 |
| 5,249,783 A | * | 10/1993 | Davis .................... | B64G 1/22 188/298 |

(Continued)

OTHER PUBLICATIONS

Canceling Oil Pan Active Powertrain Noise, Undated, in 11 pages.
Wolff et al., Active Noise Cancellation at Powertrain Oil Pan, May 15-17, 2007, in 10 pages.

*Primary Examiner* — Shardul Patel
(74) *Attorney, Agent, or Firm* — Christopher G. Darrow; Darrow Mustafa PC

(57) ABSTRACT

A vibration and noise reduction method and apparatus for a fluid reservoir containing an automotive fluid and having a bottom wall. At least a portion of the fluid reservoir is formed of or carries a shape changing material undergoing shape change at a threshold temperature. A controller detects a match between a vehicle operating vibration frequency at a measured vehicle operating characteristic and the resonant vibration frequency of the fluid reservoir and varies the resonant vibration frequency of the fluid reservoir by changing the stiffness of at least a portion of the fluid reservoir through the supply of heat to the fluid reservoir resulting in a change in the shape of at least the shape changing material in the fluid reservoir. The heat is supplied from an electrical conductor in heat transfer relation with the fluid reservoir or an elevated temperature of the automotive fluid in the fluid reservoir.

24 Claims, 4 Drawing Sheets

(56) References Cited

U.S. PATENT DOCUMENTS

| | | | | |
|---|---|---|---|---|
| 5,735,510 | A * | 4/1998 | Takehara | F16F 13/20 |
| | | | | 188/269 |
| 6,234,136 | B1 | 5/2001 | Choi et al. | |
| 7,757,808 | B1 | 7/2010 | Vaz et al. | |
| 7,946,388 | B2 | 5/2011 | Kobayashi et al. | |
| 8,528,698 | B2 * | 9/2013 | Morgan, Jr. | F16H 57/0447 |
| | | | | 184/1.5 |
| 2005/0121946 | A1 * | 6/2005 | McKnight | B60K 11/085 |
| | | | | 296/180.1 |
| 2005/0279314 | A1 * | 12/2005 | Hada | F01M 11/0004 |
| | | | | 123/192.1 |
| 2008/0288146 | A1 * | 11/2008 | Beechie | B60W 10/023 |
| | | | | 701/58 |
| 2009/0207043 | A1 * | 8/2009 | Shaffer | G08G 1/161 |
| | | | | 340/903 |
| 2012/0067322 | A1 * | 3/2012 | Andersson | F01M 11/0004 |
| | | | | 123/198 E |
| 2012/0204548 | A1 * | 8/2012 | Turnis | E02F 9/2246 |
| | | | | 60/327 |
| 2012/0240893 | A1 * | 9/2012 | Hoji | F01M 1/16 |
| | | | | 123/196 R |
| 2013/0098029 | A1 * | 4/2013 | Pinto, IV | F04B 9/02 |
| | | | | 60/527 |

\* cited by examiner

VEHICLE OIL PAN WITH ACTIVE NOISE REDUCTION CONTROL

BACKGROUND

The present disclosure relates, in general, to automotive vehicles, and, more particularly, to automotive fluid reservoir noise reduction methods and apparatuses.

Automotive vehicles include numerous components and systems which vibrate during vehicle operation. Such vibrations can create objectionable noise levels within the vehicle passenger compartment.

Vehicle transmissions and engines use automotive fluid, such as lubricant, to lubricate their operating components. A portion of such automotive fluid, typically lubricating oil, is contained in a fluid reservoir, such as an oil pan. The lubricating oil is pumped from the oil pan into the transmission or engine, as the case may be, and flows back to the oil pan in a closed loop circuit.

An automotive oil pan can take numerous shapes depending on the vehicle model. However, an oil pan usually includes a large bottom wall from which a plurality of sidewalls project. The sidewalls terminate in a mounting flange which is used to receive fasteners to attach the oil pan to the vehicle.

The large bottom wall of the oil pan is known to resonate at certain engine or transmission speeds. Such resonance creates additional vibration and, therefore, noise which adds to the noise generated by the operating transmission or engine.

It would be desirable to provide noise reduction control for an automotive fluid reservoir, such as an oil pan, which can minimize resonance of the oil pan thereby eliminating undesirable vibrations and resulting noise.

SUMMARY

A method and apparatus are disclosed for controlling vibration and noise in a fluid reservoir of an automotive vehicle.

The method includes providing at least a portion of a fluid reservoir with a shape changing material, and measuring a vehicle operating characteristic correlated with vehicle operating vibration frequencies. When a match between the resonant vibration frequency of the fluid reservoir and a vehicle operating vibration frequency is determined, the resonant vibration frequency of the fluid reservoir is altered from the vehicle operating vibration frequency to eliminate resonant frequency vibrations in the fluid reservoir and the resulting noise generated by such resonant frequency vibrations.

The change in resonant vibration frequency of the fluid reservoir can be implemented by changing a stiffness of at least a portion of the fluid reservoir through the application of heat to the shape changing material to change the shape of the shape changing material and change the resonant vibration frequency characteristics of the fluid reservoir.

The step of applying heat can include supplying electric current to a resistance heating electrical conductor disposed in heat transfer relation with at least a portion of the fluid reservoir containing the shape changing material. The step of applying heat can further include disposing the resistance heating electrical conductor in proximity with an interior wall of the fluid reservoir, or in proximity with an exterior wall of the fluid reservoir.

The step of applying heat can include elevating a temperature of the fluid in the fluid reservoir to transfer heat to the portion of the fluid reservoir containing the shape changing material. In this aspect, according to the method, the operative state of a fluid flow valve is controlled to switch fluid flow from the fluid reservoir between a first flow path through a fluid cooler and a second flow path bypassing the fluid cooler to elevate the temperature of the fluid.

A noise reduction apparatus for a fluid reservoir configured to contain automotive fluid and having a bottom wall is also disclosed. The apparatus has a portion of a bottom wall of an automotive fluid reservoir formed of a shape changing material. A vehicle operating characteristic is correlated with vehicle operating vibration frequencies. A controller executes program instructions stored in a memory containing the measured vehicle operating characteristic values correlated with vehicle operating vibrations frequencies and a resonant vibration frequency of the fluid reservoir bottom wall.

The controller, when the vehicle operating vibration frequency matches the resonant vibration frequency of the fluid reservoir, operates to change the resonant vibration frequency of the fluid reservoir to make it different than the vehicle operating vibration frequency by changing a stiffness of at least a portion of the fluid reservoir through the application of heat to at least the shape changing material carried in the fluid reservoir. This varies the stiffness and the resonant vibration frequency characteristics of the fluid reservoir and shifts the resonant vibration frequency of the fluid reservoir away from the vehicle operating vibration frequency of the vehicle.

In one example, an electrical conductor is disposed in heat transfer relation with at least a portion of the fluid reservoir containing the shape changing material. The controller allows the flow of electric current through the electrical conductor to transfer heat from the electrical conductor to the portion of the fluid reservoir containing the shape changing material.

The electrical conductor can be disposed in proximity with an interior wall surface of the fluid reservoir, or in proximity with an exterior wall surface of the fluid reservoir.

In another example, a fluid flow loop is formed between the fluid reservoir, a fluid cooler and the vehicle component using the automotive fluid partially contained in the fluid reservoir. A fluid valve controls the flow of the automotive fluid from the fluid reservoir to the cooler to control the temperature of the automotive fluid when the automotive fluid returns from the vehicle component to the fluid reservoir. A controller switches the valve to a closed position wherein the fluid bypasses the cooler so that the temperature of the fluid increases by absorption of heat from the component using the fluid such that when the fluid returns to the fluid reservoir the fluid transfers heat to the portion of the bottom wall of the fluid reservoir containing the shape changing material.

In another example, an automotive vehicle having an engine and a transmission includes lubricating fluid supplied from a fluid reservoir. At least a portion of the fluid reservoir, such as a portion of the bottom wall of the fluid reservoir, is formed of a shape changing material. A vehicle sensor measures a vehicle operating characteristic, such as engine speed or vehicle speed. A controller executes program instruction containing the measured vehicle operating characteristic, such as vehicle or engine speed correlated with vehicle operating vibration frequencies and the resonant vibration frequency of the fluid reservoir bottom wall.

The controller, when the vehicle operating vibration frequency matches the resonant vibration frequency of the fluid reservoir, changes the resonant vibration frequency of the fluid reservoir by changing a stiffness of at least a portion of a fluid reservoir through the application of heat, for example, to the shape changing material in the fluid reservoir. The applied heat changes the shape of at least a portion of the fluid reservoir and varies the stiffness and thereby the vibration characteristics of the fluid reservoir to shift the resonant vibration frequency of the fluid reservoir away from the vehicle operating vibration frequency of the vehicle.

BRIEF DESCRIPTION OF THE DRAWING

The various features, advantages and other uses of the present automotive vehicle oil pan with active noise reduction control will be more apparent in the following description and accompanying drawing in which.

DETAILED DESCRIPTION

The present disclosure defines a method and apparatus for active control of vibration and noise of an automotive fluid reservoir configured for retaining automotive fluid, such as a lubricant (i.e., oil). At least a portion of the fluid reservoir is formed of a shape changing material. A controller monitors a vehicle operating characteristic related to vehicle operating vibration frequencies, such as one of engine speed or vehicle speed. When a vehicle operating vibration frequency associated with the measured vehicle operating characteristic matches the resonant vibration frequency of the fluid reservoir, the controller changes the resonant vibration frequency of the fluid reservoir by altering the stiffness of at least a portion of the fluid reservoir through the application of heat to the fluid reservoir, or at least the portion of the fluid reservoir carrying or formed of the shape changing material. The heat will vary the shape and thereby the stiffness of at least a portion of the fluid reservoir. This change in stiffness varies the resonant vibration frequency of the fluid reservoir and shifts the resonant vibration frequency of the fluid reservoir away from the vehicle operating vibration frequency of the vehicle to minimize vibration in the fluid reservoir and eliminate the noise associated with such vibration. Several different examples of heat application are disclosed to enable implementation of the active noise reduction control of the fluid reservoir.

Automotive vehicles may incorporate elements, such as a fluid reservoir, for automotive lubrication fluid that retains a portion of the fluid used to lubricate components of a vehicle when the vehicle is operating. As one example, a vehicle engine may have a lubricant or oil pan connected to a crankcase. Transmission assemblies, as another example, may also include a fluid reservoir that collects transmission fluid. Fluid may circulate through the transmission assembly and the fluid reservoir while the transmission is operating at a rate that is dependent upon factors such as the transmission gear setting and speed. When the transmission assembly is not operating, fluid flows into the fluid reservoir by the force of gravity.

Figure 1:
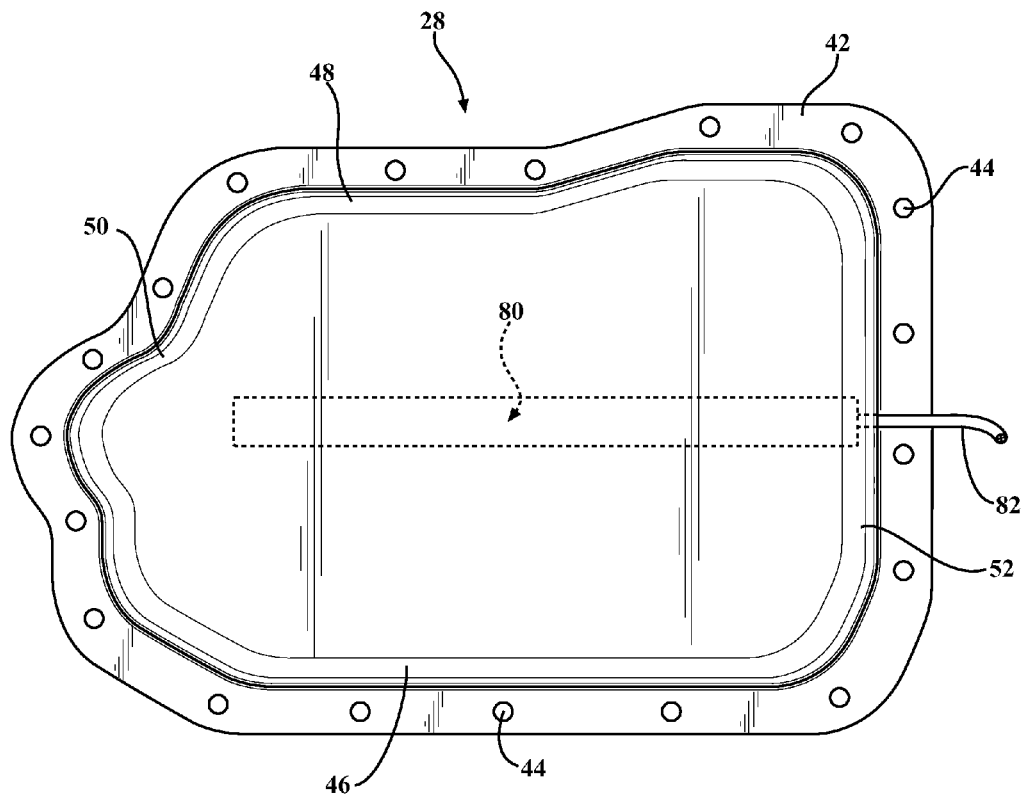
FIG. 1 is a plan view of an automotive vehicle fluid reservoir in the form of an oil pan according to one aspect of the automotive vehicle fluid reservoir with active noise reduction control.

Referring to FIG. 1, one example of the fluid reservoir 28 is illustrated as an open ended container having an upper flange 42 extending around its periphery and formed with a series of apertures 44 or other connecting structure for bolts or other fasteners, which secure the fluid reservoir 28 to a transmission case or engine crank case. Sidewalls 46, 48 extend along the length of the fluid reservoir 28, and end walls 50, 52 extend along the width of the fluid reservoir 28. A bottom wall 56 extends between the sidewalls 46, 48 forming a receptacle body. While the fluid reservoir 28 is illustrated as having a single compartment, the fluid reservoir 28 may have two or more compartments, for example, separated by one or more dividers.

Figure 3:
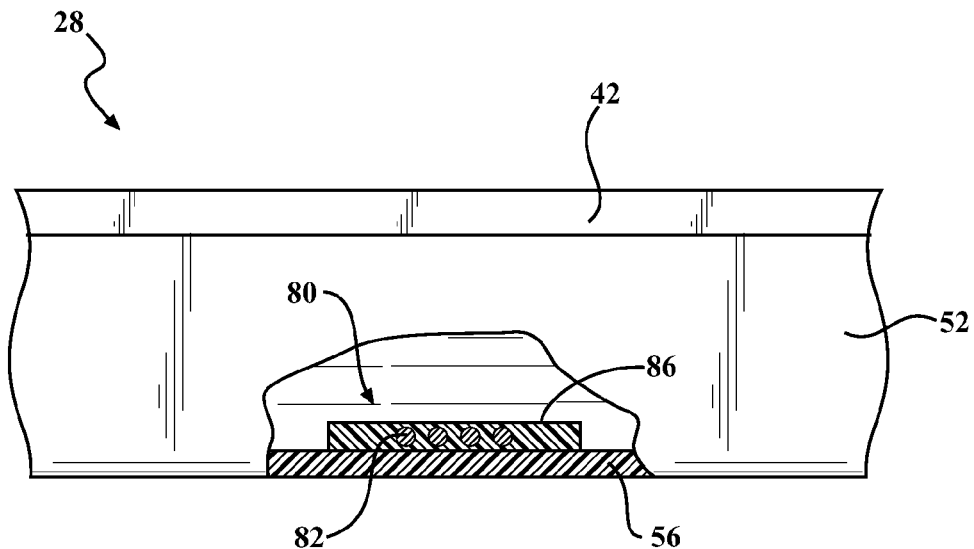
FIG. 3 is a cross-sectional view generally taken along lines 3-3 in FIG. 2 and showing one aspect of an automotive vehicle fluid reservoir with active noise reduction control.
Figure 4:
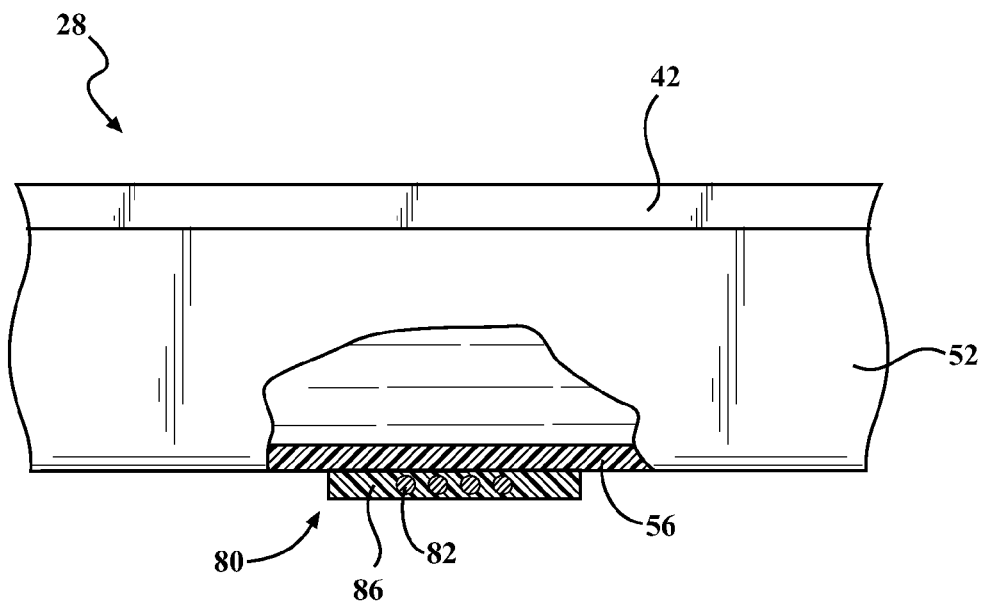
FIG. 4 is a cross-sectional view, similar to FIG. 3, but showing another aspect of an automotive vehicle fluid reservoir with active noise reduction control.

Referring now to FIGS. 3 and 4, the fluid reservoir 28 may be formed of a shape memory material or other shape changing material. Examples of suitable shape changing materials include bi-metallic strips, shape memory polymers (SMPs) and shape memory alloys (SMAs) that can be used to vary the stiffness of the fluid reservoir and, particularly, the bottom wall 56.

As used herein, the term "shape changing material" or "shape memory material" refers to any material or combination of materials (e.g., bimetallic structures) that change shape in response to a stimulus. The change in shape of the shape changing material may be in a predictable or an unpredictable manner. Bimetallic structures, for example, may generally be formed of two or more strips, or layers, of metal having different thermal coefficients of expansion, or expansion coefficient, that are laminated or otherwise joined together such that they change configuration in a manner dependent on the temperature. This change in configuration is due to changes in temperature that cause one strip to lengthen more than the other. Since both strips are joined together, this lengthening difference can be accommodated by bending. An equation for the deflection of a free end of a cantilevered bimetallic strip is:

$$D = \frac{FL^2 T}{2t}$$

where D is the deflection at the end of the strip in inches, F is flexivity, L is length in inches, t is thickness in inches and T is temperature change in degrees F. In many bimetallic strips, flexivity is equal to 1.5 times the difference in thermal coefficient of linear expansion of the high and low expanding components.

Figure 2:
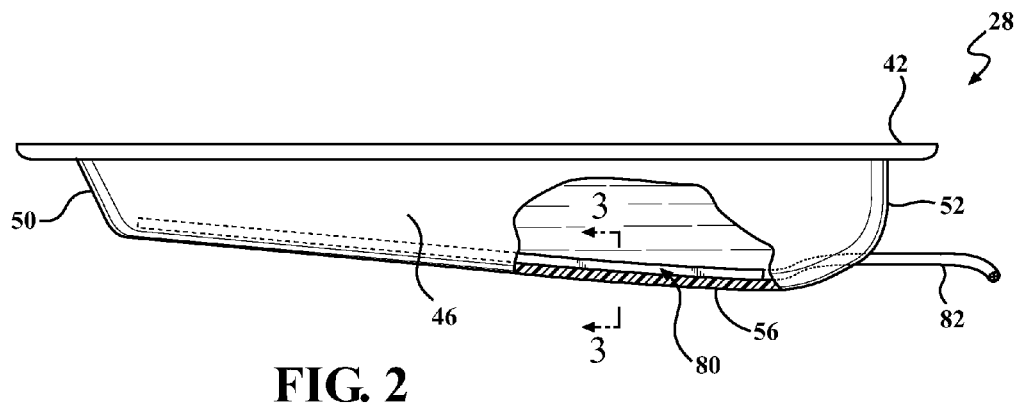
FIG. 2 is a partially broken away, side elevational view of the oil pan shown in FIG. 1.

Referring briefly to FIG. 2, an end of the bottom wall 56 may follow the bimetallic strip deflection equation above, so thinner layers and structures with layers with larger differences in expansion coefficient may show the greatest heat induced movement. Metals and/or plastics may be used in forming the layers, where plastics may have larger expansion coefficients (e.g., by a factor of ten) than some metals, providing a higher level of thermal sensitivity, if desired.

The bending direction of the bottom wall 56 can be controlled in a number of ways. In general, the bottom wall 56 may bend away from the layer with the greater expansion coefficient. Some plastics, such as polyethylene, exhibit biaxial expansion coefficients that differ in two directions. In a layer of plastic, biaxial expansion coefficients can result from stretching the plastic during manufacture, from inclusion of aligned, low-expansion fillers such as glass fibers, or from grooves or raised lines in the layer in general, so that the moveable bottom wall 56 will bend along the direction of the higher expansion coefficient.

The amount of curling may be linear with temperature. The displacement D may double with a doubling in the temperature difference, for example. A non-linear displacement can be achieved by pre-shaping the bottom wall 56 into an arc perpendicular to the direction of the thermal displacement. When heated, the bottom wall 56 tries to expand and bend, but first must overcome the forces created by the initial arc. Once the temperature rise creates enough force, the moveable bottom wall 56 may snap open into a curl or straighten out if in an initial bent shape. Nonlinear curling can be obtained by attaching a weight or small magnet to one end of the bottom wall 56. The bottom wall 56 may not move until enough force is generated to overcome the weight.

Referring back to FIGS. 1 and 2, any one or more of the sidewalls 46, 48, and the end walls 50, 52 may also be formed of the shape changing materials individually and/or in a combination of shape changing materials and non-shape-changing materials.

While bimetallic structures are discussed above, other shape changing materials may be used. For example, shape changing materials may include shape memory polymers (SMPs). SMPs are polymeric materials which have the ability to return from a deformed state (temporary shape) to their original (permanent) shape when induced by an external stimulus, such as a temperature change. A change in shape caused by a change in temperature may be referred to as a thermally induced shape-memory effect. The SMP may be programmed to recover a shape. The programming process may include any of heating a sample, deforming the sample and cooling the sample to provide a permanent shape. The permanent shape may be stored while the sample is in a temporary shape. Applying a suitable external stimulus may induce the shape-memory effect where the permanent shape is restored. In some aspects, heating the SMP above a transition temperature may induce the shape-memory effect. Cooling the SMP below the transition temperature may solidify the material. In some aspects, there may be no recovery of the temporary shape, which may be referred to as one-way shape-memory effect. Further programming, e.g., including mechanical deformation, may be used to bring the SMP into a temporary shape again, which may not necessarily match the first temporary shape.

The permanent shape of an SMP can be set by melting or processing the SMP at a temperature higher than the highest thermal transition temperature for the SMP or its melting point, followed by cooling below that thermal transition temperature. A temporary shape can be set by heating the SMP to a temperature higher than the thermal transition temperature, but lower than the highest thermal transition temperature or the melting point. The temporary shape is set by applying an external stress while processing the SMP above the thermal transition temperature followed by cooling to fix the temporary shape. With the SMP in the temporary shape, it may be applied to the structural component of the vehicle structural member. The SMP may then be reverted to the permanent shape by heating the SMP above the thermal transition temperature but below the highest thermal transition temperature or the melting point. In some aspects, triple shape memory materials may be used, which can store two shapes in memory.

SMPs may be configured in numerous forms and shapes. The temperature needed for permanent shape recovery may be set at any suitable temperature for lubricant operating temperatures. Engineering the composition and the structure of the SMP may allow for the choice of the selected temperature for the particular application.

SMPs include, but are not limited to, thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Exemplary polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, polystyrene, polypropylene, polyvinyl phenol, polyvinylpyrrolidone, chlorinated polybutylene, poly(octadecyl vinyl ether) ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbomyl-polyhedral oligomeric silsequioxane), polyvinylchloride, urethane/butadiene copolymers, polyurethane block copolymers, styrene-butadiene-styrene block copolymers, and the like, and combinations comprising at least one of the foregoing polymer components. Examples of polyacrylates include poly(methyl methacrylate), poly (ethyl methacrylate), ply(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate).

Other shape changing or shape memory materials include shape memory alloys (SMAs) which are formed of metals. Suitable SMAs can be formed of nickel-titanium alloys, copper-aluminum-nickel alloys, copper-zinc-aluminum alloys, and iron-manganese-silicon alloys.

In some aspects, selection of the thermal transition temperature may depend on a number of factors. In some aspects, it may be desirable for the transition temperature to correspond to a lubricant fluid operating temperature.

Aside from strict shape recovery, any material that can be made to linearly expand or contract along an axis in response to temperature may be used for the shape changing material. Any material selected for the shape changing material for the fluid reservoir 28 should be suitable for use under normal operating conditions of the vehicle.

The fluid reservoir 28 may take any arrangement where the sidewalls 46, 48 and the end walls 50, 52 are linear to form a polygonal shaped continuous sidewall. Any or all of the sidewalls 46, 48 and the end walls 50, 52 may have surface irregularities departing from a linear or arcuate shape. The sidewalls 46, 48 and the end wall 50, 52 may form one continuous wall, such as an in a fluid reservoir 28 having a circular, oval or oblong shape without significantly defined corners.

Figure 5:
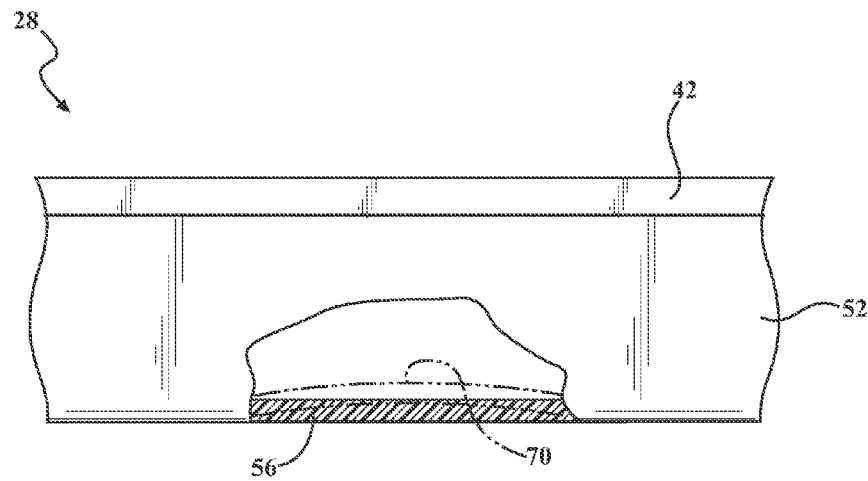
FIG. 5 is a partially broken away, cross-sectional view, similar to FIG. 3, but showing the bottom wall of the oil pan in an increased stiffness state.
Figure 6:
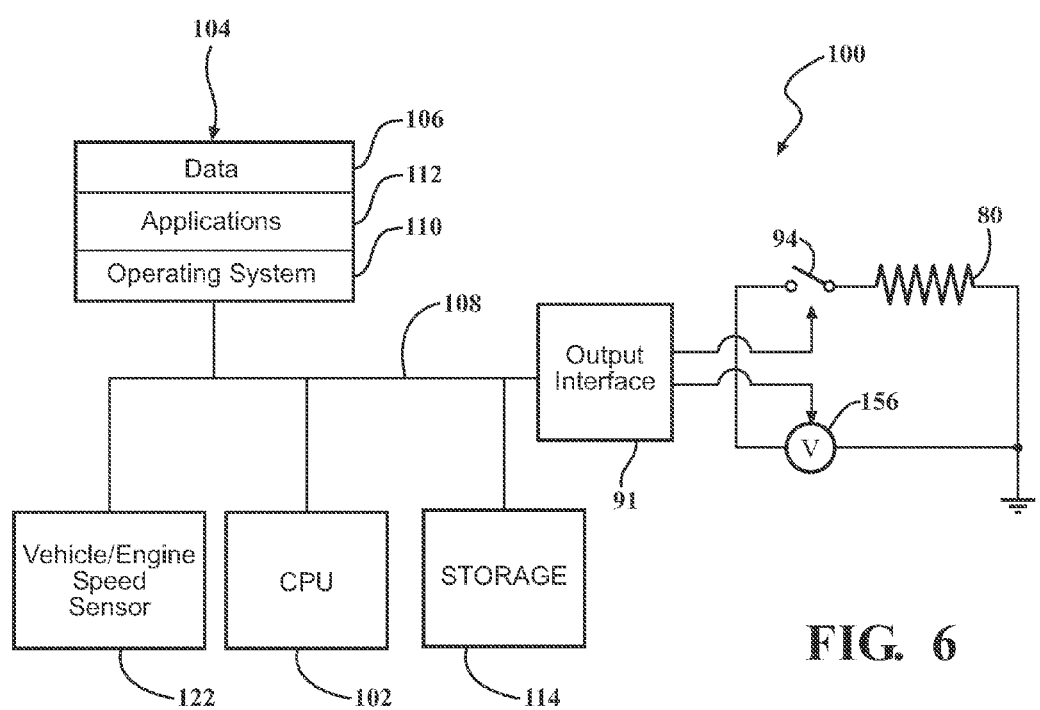
FIG. 6 is a schematic diagram of a control circuit used in the automotive vehicle fluid reservoir with active noise reduction control.

SMPs and SMAs can be formed in a variety of ways to effect a shape change. In one aspect, the SMP or SMA material may be shaped into the desired shape of the fluid reservoir 28 at an elevated temperature beyond the threshold temperature of the SMP or SMA to effect shape change. This could induce a curvature, either concave or convex, in the bottom wall 56 of the fluid reservoir 28, as shown in FIG. 5 by dotted line 70. When allowed to cool to ambient temperature, the bottom wall 56 assumes a more linear shape. In this manner, application of heat to at least the bottom wall 56 of the fluid reservoir 28 raising the temperature of the bottom wall 56, where the bottom wall 56 is formed of an SMP or SMA material, can cause the bottom wall 56 of the fluid reservoir 28 to change shape to the curved shape 70 shown by example in FIG. 5.

It will be understood that an SMP or SMA may be used to form all of the fluid reservoir 28, a portion of the fluid reservoir 28, as well as all or any portion of the sidewalls 46, 48, the end walls 50, 52 and the bottom wall 56. The particular SMP or SMA material used to form the entire fluid reservoir 28, or any desired shape changeable portion of the fluid reservoir 28, is selected so that the shape change threshold temperature can be reached by the application of a predetermined amount of heat to the SMP or SMA material portion of the fluid reservoir 28.

In the following example, the bottom wall 56 of the fluid reservoir 28 is capable of exhibiting the largest amount of vibration and, therefore, noise, when vibrating at a resonant vibration frequency. All of the bottom wall 56 or at least a portion of the bottom wall 56 may be formed of an SMP or SMA material.

The SMP or SMA material used on the bottom wall 56 may also be in the form of an insert or attachment such as a small shaped piece of SMP or SMA, which is secured to the inner or outer wall surface of the bottom wall 56 of the fluid reservoir 28 at least along a peripheral or intermediate portion of the insert. The insert is therefore capable of changing shape, as described above, thereby changing the stiffness characteristic of the bottom wall 56.

The curved shape 70 shown in FIG. 5 in the bottom wall 56, created by changing the shape of the bottom wall 56 or at least a portion of the bottom wall 56 in either a vehicle longitudinal or vehicle lateral direction, or any angular direction therebetween, changes the stiffness characteristics of the bottom wall 56 and the entire fluid reservoir 28. This change in stiffness changes the resonant vibration frequency of the bottom wall 56 or the entire fluid reservoir 28.

As described hereafter, an active noise reduction control and method is employed to change the resonant vibration frequency of the fluid reservoir 28 by changing the stiffness of at least a portion of the fluid reservoir 28 through the application of heat directly or indirectly to the shape changing material in the bottom wall 56 to raise the temperature of the shape change portion of the bottom wall 56 above the shape change threshold temperature of the shape changing material so as to cause at least a portion of the bottom wall 56, or a shape changing material insert attached to the bottom wall 56, to change shape thereby altering the stiffness characteristics of the bottom wall 56 and changing the resonant vibration frequency of the bottom wall 56.

This active noise reduction control and method can be described as including the formation of at least a portion of the fluid reservoir 28 of a shape changing material, measuring a vehicle operating characteristic correlated to vehicle operating vibration frequencies, and when a match is detected between the vehicle operating vibration frequency and the resonant vibration frequency of the fluid reservoir 28, changing the resonant vibration frequency of the fluid reservoir 28 by changing the stiffness of at least a portion of the fluid reservoir 28 through the application of heat to the shape changing material changes the shape of the shape changing material and thereby the stiffness of the fluid reservoir 28 to change the resonant vibration frequency of the fluid reservoir 28 from the vehicle operating vibration frequency of the vehicle at the measured engine speed or vehicle speed.

The application of heat to elevate the temperature of the bottom wall 56 can be implemented in different ways. In FIGS. 1-4, an electrical conductor 80 in the form of a resistance wire is mounted, such as by an epoxy, or by other fastening means suitable for the environment in which the fluid reservoir 28 is employed, on an inside wall surface of the bottom wall 56 as shown in FIG. 3 or on an outside wall surface of the bottom wall 56 as shown in FIG. 4 in heat transfer relation to the bottom wall 56. The electrical conductor 80 can include one or more electrical conductors, with one electrical conductor 80 shown as formed in multiple turns 82 along the length of the electrical conductor 80. The electrical conductor 80 can be sealed inside a suitable sealant material, such as an epoxy 86, to insulate the electrical current flowing through the electrical conductor 80 from the lubricating automotive fluid within the interior of the fluid reservoir 28, in the example shown in FIG. 3 or the exterior environment in the example shown in FIG. 4.

The electrical conductor 80 can be connected in a control circuit with a computing device, or controller 100. It will be understood that although the following description of the computing device or controller 100 is with reference to a central processing unit in the form of at least one computer processor to execute program instructions stored in a memory to effect the heating application described hereafter, other dedicated circuits, ASIC elements, etc., may also be employed.

The computing device 100 can be any type of vehicle-installed, handheld, desktop, or other form of single computing device, or can be composed of multiple computing devices. The processing unit 102 in the computing device 100 can be a conventional central processing unit (CPU) 102 or any other type of device, or multiple devices, capable of manipulating or processing data. The memory 104 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs that permit the CPU 102 to implement the apparatus and method as described below. The computing device 100 can also include secondary, additional, or external storage 114, for example, a memory card, flash drive, or any other form of computer readable medium. In one aspect, the installed applications 112 can be stored in whole or in part in the external storage 114 and loaded into the memory 104 as needed for processing.

The computing device 100 can be located within the vehicle or can be located remotely from the vehicle in an alternate location (not shown). If the computing device 100 is remote from the vehicle, the vehicle can include the capability of communicating with the computing device 100.

The computing device 100 is coupled to a suitable signal conditioner or interface 91 with a switch 94 coupled between an electric power source and the electrical conductor 80, the other end of which is coupled to ground, for example. The computing device 100 controls the open and closed position of the switch 94 to provide current flow through the electrical conductor 80 at the particular time for the duration of time necessary to implement the change in stiffness of the fluid reservoir.

It will be understood that the supply of electric power to the electrical conductor 80 disposed in heat transfer relation with at least a portion of a fluid reservoir 28 containing the shape changing material may be, when first applied, continue in a continuous state for a predetermined amount of time. Alternately, the computing device 100 may control the state of the switch 94 to supply electric power in a time spaced switched on and off modulated manner to the electrical conductor 80 to provide and maintain a certain heat level to the shape memory change material in the fluid reservoir 28.

The method includes disposing the electrical conductor 80 in proximity with an interior wall surface of the fluid reservoir 28 or in proximity with an exterior wall surface of the fluid reservoir 28.

The computing device 100 is responsive to a selected vehicle operating characteristic or condition related to vehicle operating vibration frequencies. A vehicle can be tested to develop a correlation between various vehicle operating characteristics, such as different speeds, different road conditions, etc., and the resulting vehicle operating vibration frequency. These measured characteristics, which can be one of engine speed or vehicle speed, for example, can be stored in a lookup table in the memory 104 along with the associated vehicle operating vibration frequency. In this manner, when a vehicle sensor detects a particular engine speed or vehicle speed, the computing device or controller 100 can access the lookup table in the memory 104 to determine the vehicle operating vibration frequency associated with the measured vehicle operating characteristic, i.e., engine speed or vehicle speed.

It will also be understood that the vehicle operating vibration frequency can be measured directly by a suitable vibration center on the vehicle. This sensor output can then be used by the computing device or controller 100 to access the lookup table in the memory 104 to associate the measured vehicle operating vibration frequency with the resonant vibration frequency of the fluid reservoir 28.

By example only, the selected vehicle operating characteristic is the vehicle speed along a road or, alternately, the engine speed in the form of engine RPMs. It is known that vehicle engines can generate vibrations at certain frequencies. For example, a V6 engine can generate vibrations within a 50-200 Hz range. The bottom wall 56 of the fluid reservoir 28 can also be tested to establish its resonant vibration frequency or frequencies. Typically, the bottom wall of the fluid reservoir 28 will have one primary resonant vibration frequency with lower amplitude frequencies which are multiples of the primary resonant frequency. When the vehicle operating vibration frequency of the vehicle substantially matches the resonant vibration frequency of the bottom wall 56 of the fluid reservoir 28, the bottom wall 56 vibrates creating objectionable noise.

The computing device 100 can access a lookup table stored in the memory 104 which correlates various engine or vehicle speeds with vehicle operating vibration frequencies. In this manner, when a predetermined engine or vehicle speed is reached corresponding to a vehicle operating vibration frequency corresponding to the resonant vibration frequency of the bottom wall 56 of the fluid reservoir 28, the computing device 100 activates the switch 94 to supply electric current to the electrical conductor 80. The electrical conductor 80, which is disposed in direct or indirect contact with the bottom wall 56 or over at least the portion of the bottom wall 56 containing the shape changing material, generates heat and thereby elevates the temperature of the shape changing material. Once the threshold shape change temperature is reached, the shape changing material in the bottom wall 56 changes shape, such as to the shape 70 in FIG. 5. This change in shape alters the stiffness characteristics of the bottom wall 56 of the fluid reservoir 28 changing its resonant vibration frequency. For example, if the vehicle engine is operating at an engine speed creating about a 250 Hz vehicle operating vibration frequency and a resonant vibration frequency of the bottom wall 56 of the fluid reservoir 28 is also about 250 Hz, once the engine speed reaches the predetermined speed correlating to the 250 Hz vehicle operating vibration frequency of the vehicle and the resonant vibration frequency of the bottom wall 56 of the fluid reservoir 28, the computing device 100 supplies current to the electrical conductor 82 causing heat to be supplied to the shape changing material forming at least a portion of the bottom wall 56. This heat elevates the temperature of the shape changing material eventually causing it to change shape, such as to that shown by the shape 70 in FIG. 5 altering the stiffness characteristic of the bottom wall 56 which changes the resonant vibration frequency of the bottom wall 56 by a predetermined amount, such as 5 Hz. This frequency change in the resonant vibration frequency of the bottom wall 56 is sufficient to eliminate resonant frequency vibrations of the bottom wall 56 and thereby eliminate the objectionable noise caused by such resonant frequency vibrations.

Figure 7:
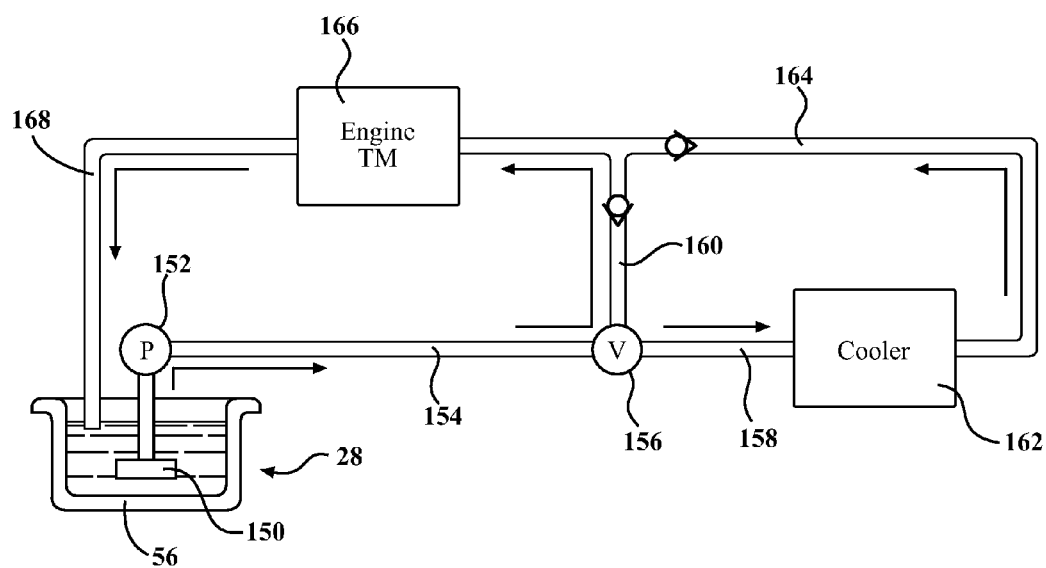
FIG. 7 is a schematic diagram of another aspect of an automotive vehicle fluid reservoir with active noise reduction control.

Another aspect of the active noise reduction control is shown in FIG. 7 for an engine transmission. It will be understood that the same teaching applies to an engine oil pan.

In this example, the method and control elevates the temperature of a fluid in the fluid reservoir 28 to transfer heat to the portion of the fluid reservoir 28 containing a shape changing material. This method and control can be implemented by using the controller 100 to control the operative state of a control fluid valve connected in fluid circuits with a fluid cooler and the vehicle component using the fluid. Selective positioning of the valve to cause fluid flow through the cooler or to bypass the cooler and selectively causes a temperature increase in the fluid. Since the fluid is disposed in heat transfer relationship with the portion of the fluid reservoir 28 containing the shape changing material, the increased heat of the fluid is transferred to the shape memory change material causing its shape to vary thereby altering the stiffness characteristics of the fluid reservoir 28 and a shift in the resonant vibration frequency of the fluid reservoir 28.

In FIG. 7, the fluid reservoir 28, including the bottom wall 56, is coupled through a filter 150 to a pump 152 which pumps oil from the interior of the fluid reservoir 28 through a first conduit 154 to a control fluid valve 156. The fluid valve 156 can be an on and off valve or a proportional valve in which the amount of fluid flow through the valve 156 can vary depending on the proportional amount that the fluid valve 156 is opened.

The valve 156 is coupled to two outlet conduits 158 and 160. Outlet conduit 158 is coupled through a cooler 162, such as a radiator, which, via heat transfer exchange, cools or reduces the temperature of the fluid flowing from the conduit 158. The outlet of the cooler 162 is coupled through a conduit 164 to the fluid flow passages in the engine transmission 166. The fluid flow outlet of the conduit 168 of the transmission 166 returns the fluid flow to the fluid reservoir 28.

The computing device 100 in response to the selected vehicle operating characteristic, such as the engine speed or vehicle speed, controls the on/off flow state of the valve 156 in a manner to elevate the temperature of the fluid flowing through the transmission 166 back to the fluid reservoir 28 where an elevated temperature fluid or oil is in contact or heat transfer relation with the bottom wall 56 of the fluid reservoir 28.

In operation, the computing device 100 will shift the valve 156 to maintain the temperature of the fluid flowing through the transmission 166 within a predetermined operating range. The valve 156, at low fluid temperatures, will cause the fluid to flow through the valve 156 and the outlet conduit 160 to the transmission 166 until the predetermined operating temperature of the fluid is reached. Thereafter, the computing device 100 may shift the valve 156 to cause the fluid to flow through the cooler 162 to reduce the temperature of the fluid back to the operating range.

In the present active noise reduction control operation, the computing device 100, upon sensing an engine speed correlating to a vehicle operating vibration frequency corresponding to the resonant vibration frequency of the fluid reservoir 28, will operate the valve 156 to close the outlet conduit 158 of the valve 156 to the cooler 162 and open the outlet conduit 160. This causes the fluid to continually flow through the transmission 166 and absorb heat generated by the operation of the transmission 166. Ultimately, the fluid flowing through the transmission 166 and into and out of the fluid reservoir 28 experiences a temperature increase. When the temperature increases to a temperature exceeding the shape changing material threshold temperature, the shape changing material forming at least a portion of the bottom wall 56 of the fluid reservoir 28 will change shape, as described above and shown in FIG. 5, to vary the stiffness characteristic of the bottom wall 56 of the fluid reservoir 28 thereby changing resonant vibration frequency of the fluid reservoir 28 away from the vehicle operating vibration frequency to minimize or eliminate vibration of the bottom wall 56 of the fluid reservoir 28.

The active noise reduction control for a vehicle lubrication fluid reservoir uses shape changing material and at least a portion of the fluid reservoir 28 which undergoes a shape change to vary the stiffness of the fluid reservoir 28 in order to the vary the resonant vibration frequency of the fluid reservoir 28 from the current vehicle operating vibration frequency to minimize resonant frequency vibrations and objectionable noise in the fluid reservoir 28. The change of shape of the shape changing material portion of the fluid reservoir 28 can be implemented in different ways, such as by applying heat from the electrical conductor 80 coupled in heat transfer relation with a portion of the fluid reservoir 28. Alternately, the temperature of the lubricating fluid retained in the fluid reservoir 28 can be elevated to the shape changing material threshold temperature.

What is claimed is:

1. A method of reducing noise in a fluid reservoir of an automotive vehicle comprising:
    measuring, in an automotive vehicle including a fluid reservoir formed at least in part from a shape changing material that is induced to change shape in response to stimulation, a vehicle operating characteristic; and
    if the measured vehicle operating characteristic indicates a vehicle operating vibration frequency matching a resonant vibration frequency of the fluid reservoir, stimulating the shape changing material to induce it to change shape, and thereby altering the resonant vibration frequency of the fluid reservoir away from the vehicle operating vibration frequency.

2. The method of claim 1 wherein the measured vehicle operating characteristic is one of engine speed and vehicle speed, further comprising:
    correlating the measured one of the engine speed and vehicle speed with the vehicle operating vibration frequency at the measured one of the engine speed and vehicle speed.

3. The method of claim 1 wherein, by the stimulation of the shape changing material to induce it to change shape, a stiffness of at least a portion of the fluid reservoir is changed, with the change of stiffness altering the resonant vibration frequency of the fluid reservoir away from the vehicle operating vibration frequency.

4. The method of claim 1 wherein the stimulation is application of heat, such that the shape changing material is induced to change shape in response to the application of heat, and stimulating the shape changing material to induce it to change shape includes applying heat to the shape changing material to induce it to change shape.

5. The method of claim 4 wherein applying heat to the shape changing material comprises:
    supplying electric current through an electrical conductor disposed in heat transfer relation with the shape changing material.

6. The method of claim 4 wherein applying heat to the shape changing material comprises:
    elevating a temperature of a fluid in the fluid reservoir to transfer heat to the shape changing material.

7. The method of claim 6 wherein elevating the temperature of the fluid in the fluid reservoir comprises switching, with a fluid flow valve, fluid flow to the fluid reservoir between a first flow path through a fluid cooler and a second flow path bypassing the fluid cooler.

8. The method of claim 1 wherein, by the stimulation of the shape changing material to induce it to change shape, a shape of the fluid reservoir is changed, with the change of shape altering the resonant vibration frequency of the fluid reservoir away from the vehicle operating vibration frequency.

9. The method of claim 8 wherein the change of shape of the fluid reservoir is one of a change from a flat shape to a curved shape, and a change from a curved shape to a flat shape.

10. The method of claim 1 wherein the shape changing material is one of a bimetal, a shape memory polymer (SMP) and a shape memory alloy (SMA).

11. The method of claim 1 further comprising:
    if the measured vehicle operating characteristic does not indicate a vehicle operating vibration frequency matching the resonant vibration frequency of the fluid reservoir, not stimulating the shape changing material to induce it to change shape.

12. A noise reduction apparatus for a fluid reservoir for an automotive vehicle comprising:
    a fluid reservoir for an automotive vehicle formed at least in part from a shape changing material that is induced to change shape in response to stimulation;
    a vehicle sensor configured to measure a vehicle operating characteristic; and
    a controller in communication with the vehicle sensor, the controller configured to execute stored program instructions to:

if the measured vehicle operating characteristic indicates a vehicle operating vibration frequency matching a resonant vibration frequency of the fluid reservoir, stimulating the shape changing material to induce it to change shape, and thereby altering the resonant vibration frequency of the fluid reservoir away from the vehicle operating vibration frequency.

13. The apparatus of claim 12 wherein, by the stimulation of the shape changing material to induce it to change shape, a stiffness of at least a portion of the fluid reservoir is changed, with the change of stiffness altering the resonant vibration frequency of the fluid reservoir away from the vehicle operating vibration frequency.

14. The apparatus of claim 12 wherein the stimulation is application of heat, such that the shape changing material is induced to change shape in response to the application of heat, and stimulating the shape changing material to induce it to change shape includes applying heat to the shape changing material to induce it to change shape.

15. The apparatus of claim 14 further comprising:
an electrical conductor disposed in heat transfer relation with the shape changing material, wherein:
the controller is in communication with the electrical conductor, and configured to execute program instructions to apply heat to the shape changing material by enabling the supply of electric current through the electrical conductor.

16. The apparatus of claim 14 further comprising:
a fluid flow circuit formed between the fluid reservoir, a fluid cooler and a vehicle component, the fluid flow circuit including a first flow path through the fluid cooler, a second flow path bypassing the fluid cooler and a fluid flow valve configured to switch fluid flow to the fluid reservoir between the first flow path and the second flow path, wherein:
the controller is in communication with the fluid flow valve, and configured to execute program instructions to apply heat to the shape changing material by switching, with the fluid flow valve, fluid flow to the fluid reservoir between the first flow path and the second flow path.

17. The apparatus of claim 12 wherein:
the vehicle sensor is configured to measure one of engine speed and vehicle speed as the vehicle operating characteristic; and
the controller is configured to execute program instructions to correlate the measured one of the vehicle speed and engine speed with the vehicle operating vibration frequency at the measured one of the engine speed and vehicle speed.

18. The apparatus of claim 12 wherein, by the stimulation of the shape changing material to induce it to change shape, a shape of the fluid reservoir is changed, with the change of shape altering the resonant vibration frequency of the fluid reservoir away from the vehicle operating vibration frequency.

19. The apparatus of claim 12 wherein the change of shape of the fluid reservoir is one of a change from a flat shape to a curved shape, and a change from a curved shape to a flat shape.

20. The apparatus of claim 12 wherein the shape changing material is one of a bimetal, a shape memory polymer (SMP) and a shape memory alloy (SMA).

21. The apparatus of claim 12 wherein the controller is configured to execute program instructions to, if the measured vehicle operating characteristic does not indicate a vehicle operating vibration frequency matching the resonant vibration frequency of the fluid reservoir, not stimulating the shape changing material to induce it to change shape.

22. The apparatus of claim 12 wherein the fluid reservoir has a bottom wall formed at least in part from the shape changing material.

23. The apparatus of claim 12 wherein the fluid reservoir is an oil pan configured for securement to an engine crank case.

24. The apparatus of claim 12 wherein the fluid reservoir is configured for securement to a transmission case.

* * * * *

UNITED STATES PATENT AND TRADEMARK OFFICE
CERTIFICATE OF CORRECTION

| | |
|---|---|
| PATENT NO. | : 9,494,279 B2 |
| APPLICATION NO. | : 14/520315 |
| DATED | : November 15, 2016 |
| INVENTOR(S) | : Michael E. Antonakakis |

Page 1 of 1

It is certified that error appears in the above-identified patent and that said Letters Patent is hereby corrected as shown below:

In the Claims

Column 13, Line 4: replace "stimulating" with --stimulate--
Column 14, Line 18: replace "12" with --18--
Column 14, Line 29: replace "stimulating" with --stimulate--

Signed and Sealed this
Sixth Day of June, 2017

Michelle K. Lee
*Director of the United States Patent and Trademark Office*